(12) United States Patent
Iwahara

(10) Patent No.: US 9,070,079 B2
(45) Date of Patent: Jun. 30, 2015

(54) PRINTER AND PRINTING SYSTEM

(71) Applicant: Seiko Epson Corporation, Tokyo (JP)

(72) Inventor: Yuma Iwahara, Ueda (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/482,658

(22) Filed: Sep. 10, 2014

(65) Prior Publication Data

US 2014/0376010 A1    Dec. 25, 2014

Related U.S. Application Data

(62) Division of application No. 13/762,420, filed on Feb. 8, 2013, now Pat. No. 8,857,942.

(30) Foreign Application Priority Data

Feb. 9, 2012    (JP) ................................. 2012-026096

(51) Int. Cl.
| | |
|---|---|
| *B41J 11/00* | (2006.01) |
| *G06K 15/00* | (2006.01) |
| *G06F 3/12* | (2006.01) |
| *G06K 15/02* | (2006.01) |

(52) U.S. Cl.
CPC ........... *G06K 15/4065* (2013.01); *B41J 11/009* (2013.01); *B41J 11/0075* (2013.01); *G06F 3/1203* (2013.01); *G06F 3/1259* (2013.01); *G06K 15/024* (2013.01); *G06K 15/028* (2013.01); *G06K 15/1803* (2013.01)

(58) Field of Classification Search
USPC ........... 347/9, 14, 16, 19, 171, 211, 213–215, 347/217–219, 222; 400/611, 613, 618, 621
See application file for complete search history.

(56) References Cited

U.S. PATENT DOCUMENTS

| | | | | |
|---|---|---|---|---|
| 5,305,199 | A | * | 4/1994 | LoBiondo et al. ............... 347/19 |
| 5,548,390 | A | | 8/1996 | Sugisaki et al. |
| 6,092,943 | A | * | 7/2000 | Dan ................................. 347/19 |
| 8,384,950 | B2 | * | 2/2013 | Kuwahara ....................... 347/14 |
| 2013/0249991 | A1 | | 9/2013 | Iwahara |

FOREIGN PATENT DOCUMENTS

| | | |
|---|---|---|
| JP | 06-312559 A | 11/1994 |
| JP | 07-237336 A | 9/1995 |
| JP | 2001-324839 A | 11/2001 |
| JP | 2005-271354 A | 10/2005 |

* cited by examiner

*Primary Examiner* — Kristal Feggins
(74) *Attorney, Agent, or Firm* — Nutter McClennen & Fish LLP; John J. Penny, Jr.

(57) ABSTRACT

A printer 3 with a paper consumption output function resets the count of a paper consumption counter 32 (ST22) when a start measuring command C1 is received from the host computer 2 side, and measures the paper consumption 32A from a specific start measurement time to a specific stop measurement time using a paper consumption counter 32 (ST23*b* to ST27*b*). When a fetch paper consumption command C2 is received (ST41), the printer 3 outputs the paper consumption 32A, which is the count of the paper consumption counter 32, to the host computer 2 (ST43).

19 Claims, 4 Drawing Sheets

PRINTER AND PRINTING SYSTEM

Priority is claimed under 35 U.S.C. §120 to U.S. patent application Ser. No. 13/762,420 filed on Feb. 8, 2013, and 35 U.S.C. §119 to Japanese Application No. 2012-026096 filed on Feb. 9, 2012, are hereby incorporated by reference in its entirety.

BACKGROUND

1. Technical Field

The present invention relates to a printer that prints forms and tickets, and a printing system that uses this printer. More particularly, the invention relates to a printer that can calculate and output paper consumption indicating how much paper is consumed in a single printing operation, and to a printing system that uses this printer.

2. Related Art

Printers commonly have a configuration known as a maintenance counter that internally measures and stores maintenance data such as the cumulative amount of paper fed through the printer. The maintenance counter is formed in nonvolatile memory, and typically includes two counters, a cumulative counter that measures the maintenance data continuously from the first use of the printer after shipping from the factory, and a resettable counter that can be reset by a specific command. The count from the cumulative counter enables knowing total usage from when the printer shipped, for example. The resettable counter can be reset each time a consumable material used by the printer is replaced, and by issuing a warning when the count of this counter exceeds a specific value, the user can know that the consumable must be replaced or maintenance is required.

JP-A-H06-312559 teaches a printer with this type of maintenance counter. The disclosed printer has a nonvolatile first maintenance counter that counts the length of the conveyed paper, indicates when parts need replacing, and can be cleared in a specific mode, and a nonvolatile second maintenance counter that counts the conveyed paper length and cannot be cleared.

The count from the first maintenance counter is used to manage the service life of consumable parts such as the platen. When the count reaches a specific value, consumable parts are replaced and the first maintenance counter is cleared in order to manage the service life of the newly installed parts.

The second maintenance counter is not cleared even in the specific mode entered when replacing parts, continues counting the conveyed paper length, and the count from this counter can therefore be used to manage total usage from when the printer shipped.

The maintenance counter used in the disclosed printer cannot be frequently reset because the count is stored in nonvolatile memory, and the maintenance data that is counted is limited to maintenance data that is kept for a relatively long time, such as the interval until consumable parts are replaced. For example, the conveyed paper length used as maintenance data is reset when consumable parts are replaced in the paper feed mechanism or when maintenance is performed on the paper feed mechanism.

As a result, the maintenance counter according to the related art cannot acquire information related to paper consumption by the printer during an extremely short period of time, such as how much paper is consumed in a single printing operation (print job), or more particularly the amount of paper (length of paper) used to print one form or ticket, for example. In addition, the amount of paper consumed or the paper consumption status of the printer during a particular period of time specified by the user cannot be easily obtained.

Furthermore, because the maintenance counter of a conventional printer is for measuring printer maintenance data, the paper feed length that is counted as the maintenance data is the total length of paper conveyed by the paper feed mechanism, that is, the total distance that paper is conveyed by the paper feed mechanism in both the forward and reverse directions. As a result, paper consumption in a single printing operation, or more specifically the forward conveyance distance, cannot be accurately determined from the count of the maintenance counter. For example, the length of paper used by the printer to print a label, receipt, or coupon cannot be accurately confirmed from the count kept by the maintenance counter.

SUMMARY

A printer and a printing system using a printer according to the present invention can accurately calculate and output paper consumption during a shorter period of time than the related art or during a desired period of time specified by the user.

A printer according to one aspect of the invention has a paper consumption counter formed in volatile memory; a start measuring command execution unit that executes a start measuring command that commands starting measuring paper consumption; and a fetch paper consumption command execution unit that executes a fetch paper consumption command commanding outputting the paper consumption. The start measuring command execution unit resets the count of the paper consumption counter when the start measuring command is received, and measures the paper consumption from a specific start measurement time to a specific stop measurement time using the paper consumption counter. The fetch paper consumption command execution unit outputs the paper consumption expressed by the count of the paper consumption counter to an external device when the fetch paper consumption command is received.

This aspect of the invention measures paper consumption using a paper consumption counter that is created in volatile memory. The amount of paper that was actually consumed (conveyed) can therefore be measured without affecting a maintenance counter rendered in nonvolatile memory that already measures the paper conveyance length that is monitored as maintenance data. In addition, because the paper consumption counter is formed in volatile memory, there is no limit to the number of times memory content can be rewritten, and the paper consumption counter can be reset at any desired time, unlike implementations in which the paper consumption counter uses nonvolatile memory.

The user can also reset the paper consumption counter and start measuring paper consumption when desired by sending (inputting) a start measuring command to the printer, and can cause the printer to output and thereby acquire the count of the paper consumption counter at the desired timing by sending (inputting) a fetch paper consumption command to the printer.

In another aspect of the invention, the start measuring command includes a command parameter specifying the start measurement time and the stop measurement time for measuring paper consumption; and the start measuring command execution unit measures the paper consumption during the period from the start measurement time to the stop measurement time specified by the command parameter.

This aspect of the invention is extremely convenient because the user can use the start measuring command to measure paper consumption by the printer during a desired period at a desired time.

In another aspect of the invention, the start measurement time and the stop measurement time specified by the start measuring command are the start time and the end time of the printing operation for printing one print job on the paper; and the paper consumption is the length of paper consumed by one print job.

In this aspect of the invention the user can know the length of the printing paper used, for example, to print one receipt, label, or other form, coupon, or other type of ticket.

In another aspect of the invention, the start measuring command includes a command parameter for specifying a unit of measurement for the paper consumption; and the start measuring command execution unit measures the paper consumption using the unit of measurement specified by the command parameter.

Print dots printed by the printhead, the number of lines printed, or a unit of length such as millimeters, centimeters, or inches, are examples of units of measurement that can be specified by the control parameter, and at least one such unit can be specified using the control parameter. For example, if the length of paper conveyed in the forward direction by the printer paper conveyance mechanism is the number of print dots, the length of the printing paper that is output can be measured with good precision.

In another aspect of the invention, the fetch paper consumption command execution unit outputs the paper consumption measured in the unit of measurement specified by the command parameter to an external device. This aspect of the invention enables the user to know how much paper was consumed using the unit of measurement specified by the user.

In another aspect of the invention, the printer measures the cumulative conveyance of paper conveyed in the forward direction and the reverse direction by the printer paper conveyance mechanism using a maintenance counter formed in nonvolatile memory, and can thereby manage when consumable parts in the paper conveyance mechanism need replacing, the maintenance interval, and printer usage since factory shipment.

Another aspect of the invention is a printing system including a host computer, and a printer that drives a printer printhead and a printer paper conveyance mechanism, and prints on paper, based on a command and print data supplied from the host computer. The host computer has a command generator that generates a start measuring command that commands measuring paper consumption by the printer, and a fetch paper consumption command that commands outputting the measured paper consumption. The printer has a paper consumption counter formed in volatile memory, a start measuring command execution unit that executes the start measuring command, and a fetch paper consumption command execution unit that executes the fetch paper consumption command.

A printing system according to the invention can be used as a POS terminal, for example, and the user can receive and confirm paper consumption during a desired interval at the desired time from the printer by sending a start measuring command and fetch paper consumption command from the host computer side (such as the POS terminal side) to the printer.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of a printing system including a printer with a paper consumption output function according to the present invention is described below with reference to the accompanying figures.

Figure 1:
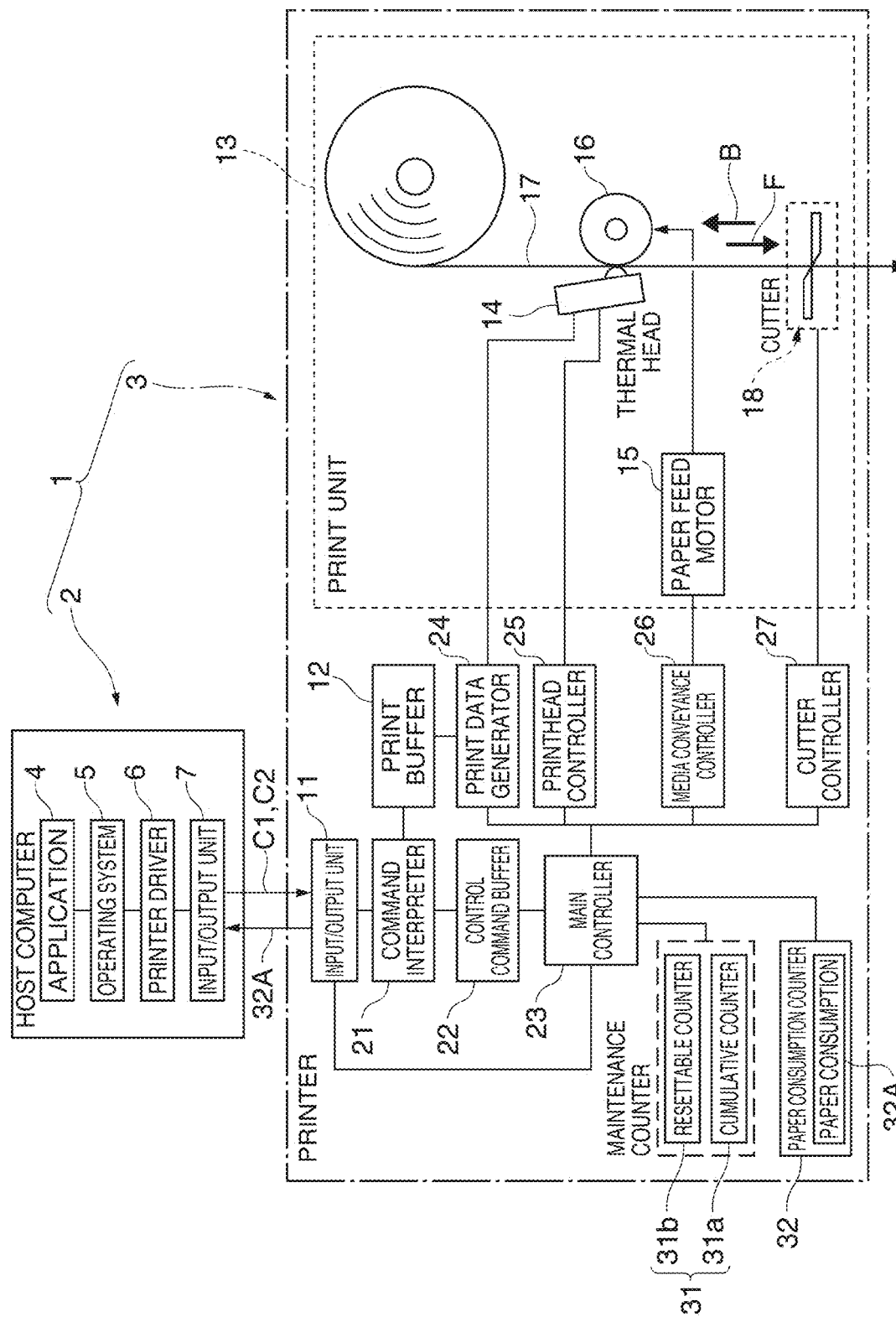
FIG. 1 is a function block diagram showing an example of a printing system according to the invention.

FIG. 1 is a function block diagram showing a printing system according to this embodiment of the invention. The printing system 1 includes a host computer 2, and a thermal printer 3 that executes a printing operation based on commands and print data from the host computer 2.

The host computer 2 includes an application 4, operating system 5, printer driver 6, and input/output unit 7. The application 4 is a program for generating image data. The operating system 5 is the basic operating program that controls the host computer 2. The printer driver 6 handles operations such as image processing (including a color conversion process) and a command conversion process. The input/output unit 7 includes an output unit that outputs commands and print data to the printer 3, and an input unit that receives data input from the printer 3.

The host computer 2 application 4 has a function for generating a start measuring command C1 that tells the printer 3 to measure paper consumption 32A indicating how much paper is consumed by the printer 3 described below, and a fetch paper consumption command C2 that tells the printer 3 to output the measured paper consumption 32A.

The control system of the printer 3 is built around a CPU, ROM, and RAM, and includes an input/output unit 11, a print buffer 12, and a print unit 13. The input/output unit 11 includes an input unit to which commands and print data output from the host computer 2 are input, and an output unit that outputs data to the host computer 2. The print buffer 12 temporarily stores the input print data. The print unit 13 prints based on the print data stored in the print buffer 12.

The print unit 13 includes a thermal line head 14 and a paper feed motor 15. Printing paper 17 can be conveyed downstream (forward conveyance direction F) and upstream (reverse conveyance direction B) through a conveyance path that passes the printing position of the thermal head 14 by rotationally driving a platen roller 16 with the paper feed motor 15. A desired print image is formed on the printing paper 17 by synchronizing driving the paper feed motor 15 and driving the dot line (heat element line) of the thermal head 14. A cutter 18 that can cut widthwise across the printing paper 17 is disposed at the downstream end of the conveyance path, and cuts the printing paper 17 to a specific length after printing is completed to issue various types of printed tickets, including receipts, labels, and other forms, coupons and similar tickets, including lottery tickets.

The content of print data stored in the print buffer 12 is interpreted by a command interpreter 21. The command interpreter 21 stores the input print data in the control command buffer 22 when the input print data is interpreted to be control command data, and stores the input data to the print buffer 12 when the data is determined to be image data.

The main controller 23 reads the control command data temporarily stored to the control command buffer 22 and executes the processes corresponding to the control commands.

Image data temporarily stored to the print buffer 12 is converted by the print data generator 24 to generate and store dot pattern data corresponding to the dot line of the thermal head 14 in the print buffer 12.

A printhead controller 25, media conveyance controller 26, and cutter controller 27 are connected to a main controller 23 to execute processes including a printing process. The printhead controller 25 controls driving the thermal head 14, and controls driving the individual dots according to the dot pattern data generated by the print data generator 24.

The media conveyance controller 26 drives the paper feed motor 15 and controls rotation of the platen roller 16, and the cutter controller 27 controls cutting the printing paper 17 with the cutter 18.

A maintenance counter 31 configured in EEPROM or other nonvolatile memory, and a paper consumption counter 32 configured in RAM or other volatile memory, are connected to the main controller 23 of the printer 3. The maintenance counter 31 measures and stores printer 3 maintenance data. This maintenance data includes the total number of times the dot line of the thermal head 14 was driven since the printer 3 shipped, and the total length of paper conveyed by the paper conveyance mechanism (paper feed motor 15 and platen roller 16). This embodiment has two types of maintenance counters 31, a cumulative counter 31a that measures the maintenance data continuously from first use of the printer after shipping, and a resettable counter 31b that can be reset by a specific command. Total usage from the time the printer shipped can be known from the count kept by the cumulative counter 31a. The resettable counter 31b can be reset when a consumable is replaced, and by issuing a warning when this count exceeds a specific value, the user can know that it is time to replace the consumable or that maintenance is required.

The paper conveyance length is the number of dots counted by adding 1 each time the printing paper 17 is advanced the distance of one dot printed by the thermal head 14, for example. The paper feed motor 15 in this embodiment is a stepper motor, and the paper feed mechanism is configured so that the paper conveyance length resulting from the stepper motor driving one step forward or reverse is one print dot. The paper conveyance length can therefore be expressed using a unit of length (mm, cm, or other) by multiplying the total representing the number of print dots by the paper feed length corresponding to one print dot.

The paper consumption counter 32 formed in volatile memory is reset by the main controller 23 and measures the paper consumption 32A during a specified period when the start measuring command C1 is supplied from the host computer 2 side. This paper consumption 32A is an amount denoting the length of printing paper that is conveyed in the forward conveyance direction F by the platen roller 16. As a result, counting is controlled by the main controller 23 so that the count of the paper consumption counter 32 increases 1 when the printing paper 17 is fed one print dot in the forward conveyance direction F, and decreases 1 when the printing paper 17 is reversed one dot in the reverse conveyance direction B. When the fetch paper consumption command C2 is supplied from the host computer 2 side, the paper consumption 32A, which is the count stored in the paper consumption counter 32, is sent through the input/output unit 11 to the host computer 2 as controlled by the main controller 23.

The control system of the printer 3 thus includes a start measuring command execution function that executes the start measuring command C1 that commands starting measuring paper consumption 32A, and a fetch paper consumption command execution function that executes the fetch paper consumption command C2 that commands outputting the paper consumption 32A. When the start measuring command C1 is received, the start measuring command execution function resets the count of the paper consumption counter 32, and then uses the paper consumption counter 32 to measure paper consumption from a specific start measurement time to a specific stop measurement time. When the fetch paper consumption command C2 is received, the fetch paper consumption command execution function executes a paper consumption output operation that outputs the paper consumption 32A, which is the count stored by the paper consumption counter 32, to an external device.

The start measuring command C1 includes command parameters that specify the start measurement time and stop measurement time for the paper consumption 32A. The command interpreter 21 of the host computer 2 interprets the start measuring command C1 and determines the start measurement time and stop measurement time specified by these command parameters. The main controller 23 uses the paper consumption counter 32 to measure the paper consumption 32A between the specified start measurement time and stop measurement time.

The start measuring command C1 containing these command parameters may be predefined in the application 4 installed on the host computer 2, or the start measurement time and stop measurement time could be input by the user.

Figure 2:
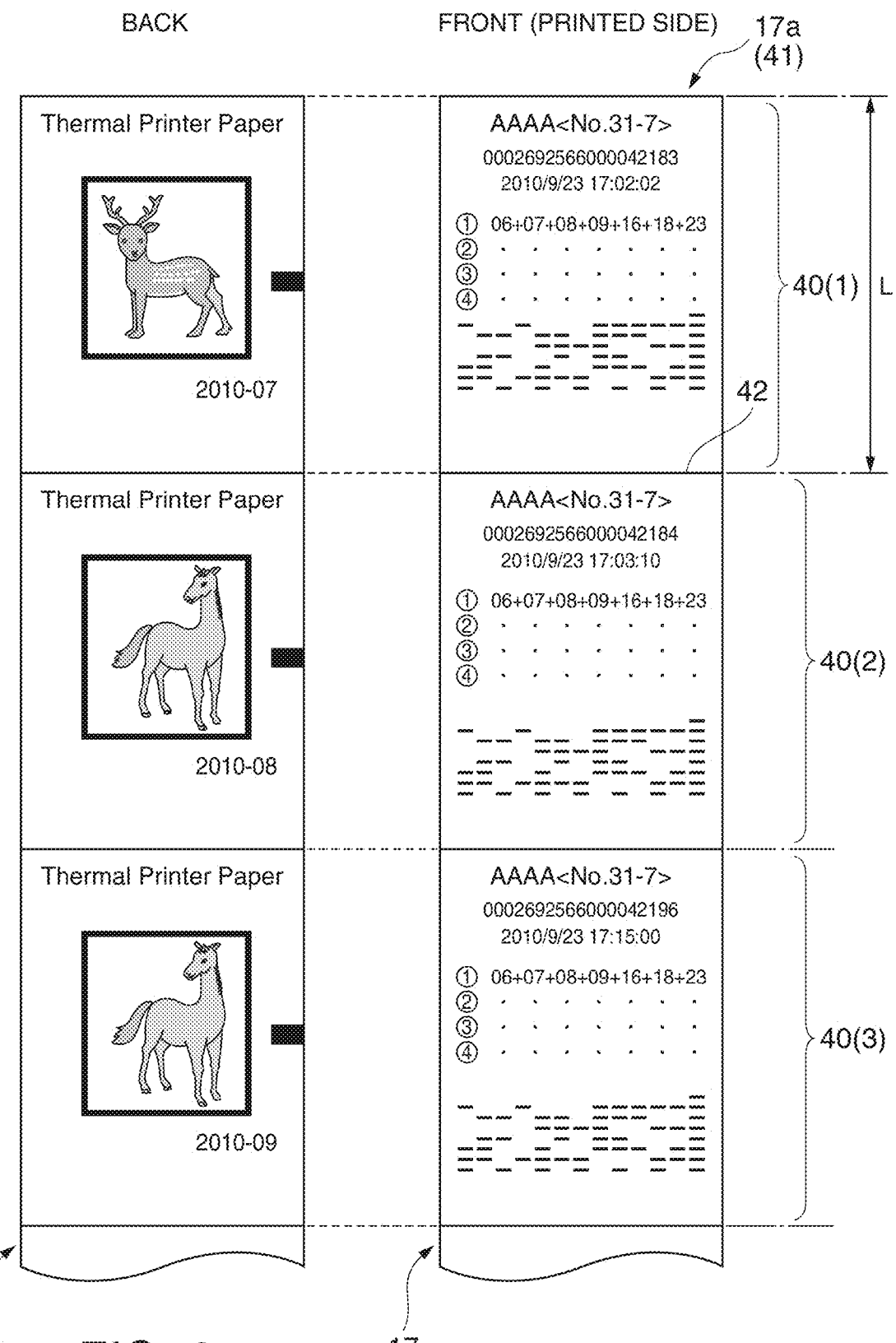
FIG. 2 shows a sample printout on printing paper.

FIG. 2 shows a sample printout from the host computer 2, (a) showing the back side of the printing paper 17, and (b) showing the printout on the front of the printing paper 17. The printout shown in FIG. 2 is printing paper 17 for printing lottery tickets (such as Lottery or Lotto tickets) for which the buyer selects the numbers. An image, serial number, or other content for preventing forgery is preprinted at a constant interval on the back of the printing paper 17, which is a web of roll paper of a constant width. Information such as the date of issue, place issued (name of store or point of sale), and a ticket number, and a set of numbers that are selected automatically or by the buyer, and a machine-readable code representing the selected numbers, are printed by the printer 3 on the front of the paper. This example shows three tickets 40(1), 40(2), and 40(3) being printed.

Figure 3:
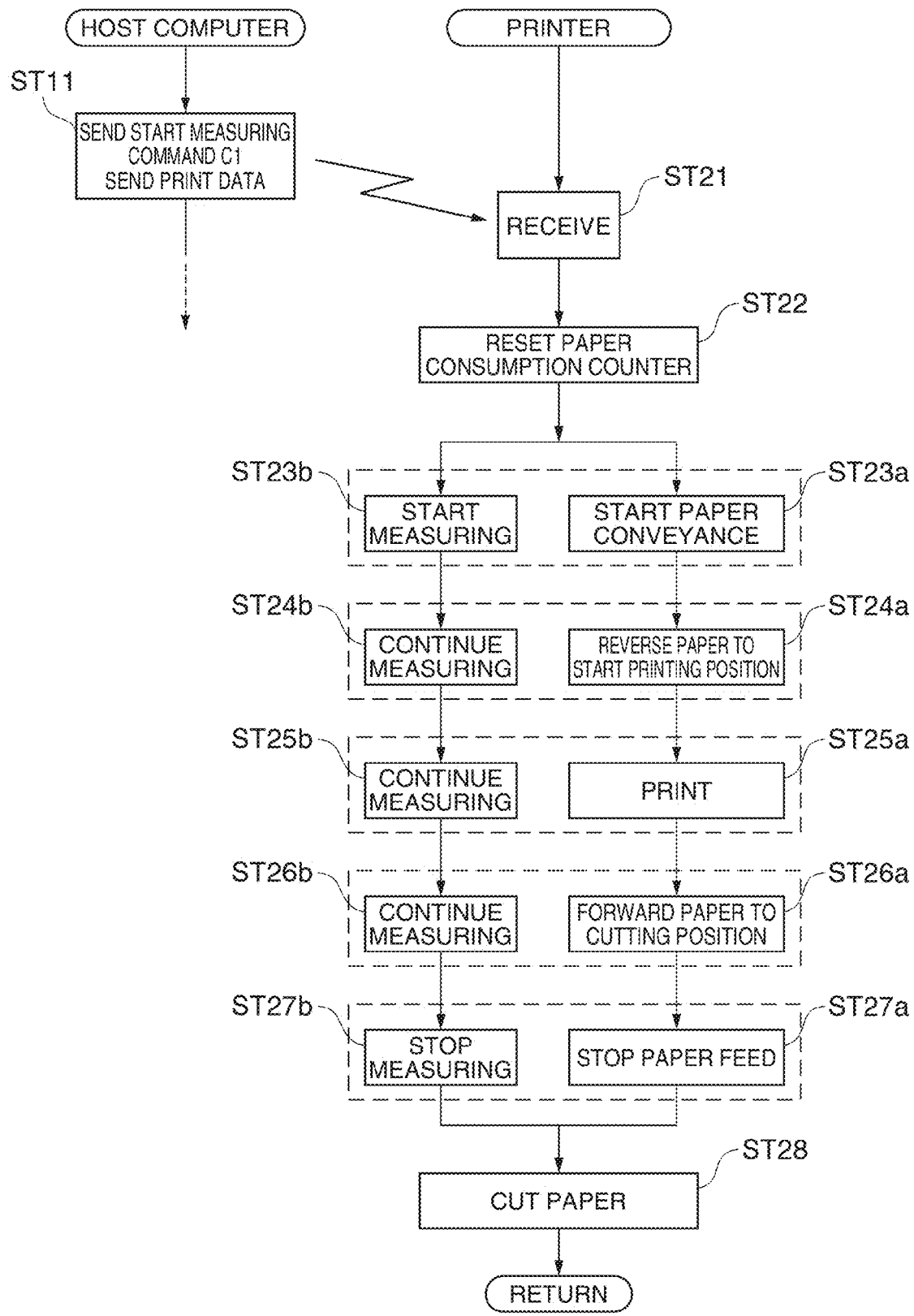
FIG. 3 is a flow chart of an operation that starts measuring paper consumption.

FIG. 3 is a flow chart showing the operation when the host computer 2 instructs the printer 3 to measure the paper consumption 32A when printing and issuing the first lottery ticket 40(1) when printing the lottery tickets shown in FIG. 2.

In this event, a start measuring command C1 is sent to the printer 3 before the user sends a print command and print data to the printer 3 to print one lottery ticket 40(1) through the application 4 on the host computer 2 side (step ST11). This start measuring command C1 includes the command parameters specifying the start measurement time and stop measurement time. In order to know the paper consumption 32A resulting from printing one lottery ticket 40(1), the start time and end time of the one print job required to print the lottery ticket (the start time and end time of one print operation) are specified as the start measurement time and stop measurement time in this embodiment.

When the waiting printer 3 receives the start measuring command C1 and print data from the host computer 2 side through the input/output unit 11 (step ST21), the start measuring command C1 is interpreted by the command interpreter 21. When the start measuring command C1 is received, the main controller 23 resets the paper consumption counter 32 formed in volatile memory, thus setting the count to zero (step ST22). The main controller 23 also saves the start measurement time and stop measurement time specified in the start measuring command C1 in internal memory.

The printer 3 generates print data based on the print data for the lottery ticket 40(1) received after the start measuring command C1, and starts the lottery ticket 40(1) print operation. The print operation includes, for example, driving the paper feed motor 15 through the media conveyance controller 26 to start conveying the printing paper 17 by means of the platen roller 16 (step ST23a).

Simultaneously to the start of paper conveyance, the main controller 23 starts measuring paper consumption with the paper consumption counter 32 (step ST23b). For example, when the leading end 17a of the printing paper 17 (the leading end 41 of the lottery ticket 40(1)) (see FIG. 2) reaches the cutting position of the cutter 18, the printing paper 17 is reversed in reverse conveyance direction B for indexing to position the start printing position of the print area of the lottery ticket 40(1) on the printing paper 17 to the printing position of the thermal head 14 (step ST24a). While reversing the paper for indexing, −1 is added to the count of the paper consumption counter 32 each time the printing paper 17 is reversed the amount of one print dot (step ST24b).

The printing paper 17 is then conveyed in the forward conveyance direction F while synchronously driving the thermal head 14 through the printhead controller 25 to print on the printing paper 17 while intermittently advancing the printing paper 17 one print dot at a time (step ST25a). Each time the printing paper 17 is advanced one print dot as printing continues, 1 is added to the count of the paper consumption counter 32 (step ST25b).

After printing with the thermal head 14, the printing paper 17 is further conveyed in the forward conveyance direction F to position the trailing end 42 (FIG. 2) of the printed lottery ticket 40(1) to the cutting position of the cutter 18 (step ST26a). The count of the paper consumption counter 32 is also incremented by 1 each time the printing paper 17 is advanced one print dot during this conveyance operation (step ST26b).

Conveying the printing paper 17 stops when the trailing end 42 of the lottery ticket 40(1) reaches the cutting position, and the one printing operation thus ends (step ST27a). The main controller 23 simultaneously stops the counting operation of the paper consumption counter 32 (step ST27b). The cutter 18 is then driven, and the printing paper 17 is cut at the trailing end 42 (FIG. 2) of the printed lottery ticket 40(1) (step ST28). This completes production of one lottery ticket 40(1).

The paper consumption 32A required to produce one lottery ticket 40(1), or more specifically the paper length L of the lottery ticket 40(1) (FIG. 2), is thus measured by the paper consumption counter 32.

If the user then wants to know the paper length L (paper consumption 32A) of the printed lottery ticket 40(1), the user sends the fetch paper consumption command C2 to the printer 3 from the application 4 of the host computer 2.

Figure 4:
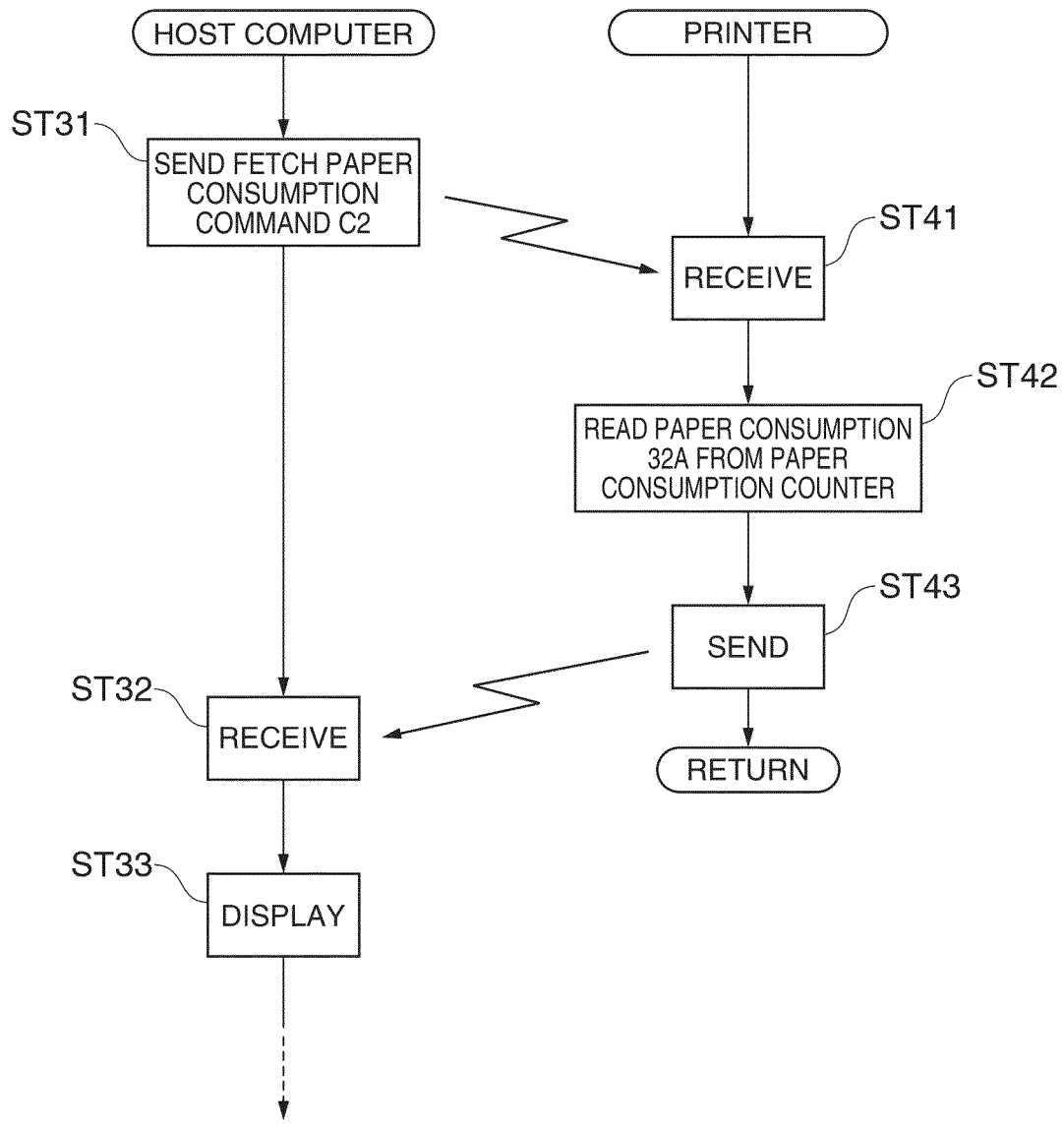
FIG. 4 is a flow chart of an operation that acquires the measured paper consumption.

FIG. 4 is a flow chart of the operation for retrieving the paper consumption information. To learn the paper length L (paper consumption 32A) of the lottery ticket 40(1) after printing one lottery ticket 40(1) shown in FIG. 2, the fetch paper consumption command C2 is sent to the printer 3 before sending the print command for the next lottery ticket 40(2) (step ST31).

When the fetch paper consumption command C2 is received by the printer 3 (step ST41), the paper consumption 32A (paper length L) stored in the paper consumption counter 32 is read as controlled by the main controller 23 (step ST42). The retrieved paper consumption 32A is then sent through the input/output unit 11 to the host computer 2 (step ST43).

When the paper consumption 32A is received from the printer 3 on the host computer 2 side (step ST32), the information is displayed on a monitor (not shown in the figure), for example (step ST33). As a result, the user can know the paper length L of the printed lottery ticket 40(1), that is, the paper consumption 32A required to produce one lottery ticket 40(1). Because the paper consumption 32A in this embodiment is expressed by the number of print dots, the host computer 2 side can easily display the paper consumption 32A converted to a unit of length such as mm or cm. The paper consumption 32A could also be converted to a specific unit on the printer 3 side before being sent to the host computer 2.

Further alternatively, the paper consumption unit could also be included in the command parameters of the start measuring command C1 or fetch paper consumption command C2, and the user could be enabled to specify the unit used to express paper consumption.

The foregoing example describes measuring the length of one printed lottery ticket, but the paper consumption counter 32 could be used to measure paper consumption in various ways between the start measurement time and stop measurement time, including paper consumption in a print job that prints plural forms or tickets continuously.

The start measuring command C1 is described as including command parameters specifying the start measurement time and stop measurement time of the paper consumption 32A, but configurations in which the start measuring command C1 does not contain a command parameter specifying the start measurement time or the stop measurement time are also conceivable.

When a command parameter for the start measurement time is not included, for example, the main controller 23 could be configured to reset the paper consumption counter 32 and start the paper consumption measurement operation when the start measuring command C1 is received.

When a command parameter for the stop measurement time is not included, the main controller 23 could be configured to run the paper consumption measurement operation continuously from when the start measuring command C1 is received, and when the next start measuring command C1 is received, reset the paper consumption counter 32 and continue the paper consumption measurement operation.

The invention is described above using a thermal printer as an example, but the invention can obviously also be used in printers that use other types of printheads, including inkjet printers.

The paper used for printing is also not limited to continuous roll paper, and cut-sheet paper could be used instead. The printed content is obviously also not limited to the content described above.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A paper consumption method of a printer comprising a print head, the method comprising:
   executing a start measuring command that commands starting measuring paper consumption;

executing a fetch paper consumption command that commands outputting the paper consumption;

resetting a count of a paper consumption counter when the start measuring command is received;

measuring the paper consumption from a specific start measurement point to a specific stop measurement point using the paper consumption counter; and outputting the paper consumption expressed by the count of the paper consumption counter to an external device when the fetch paper consumption command is received.

2. The paper consumption method of a printer described in claim 1, wherein:

the start measuring command includes a command parameter specifying the specific start measurement point and the specific stop measurement point for measuring paper consumption; and further comprising:

measuring the paper consumption during the period from the start measurement point to the stop measurement point specified by the command parameter.

3. The paper consumption method of a printer described in claim 1, wherein:

the specific start measurement point and the specific stop measurement point specified by the start measuring command are a start point and an end point of a printing operation for printing one print job on the paper; and the paper consumption is the length of paper consumed by one print job.

4. The paper consumption method of a printer described in claim 1, wherein:

the start measuring command includes a command parameter for specifying a unit of measurement for the paper consumption; and the method further comprising:

measuring the paper consumption using the unit of measurement specified by the command parameter.

5. The paper consumption method of a printer described in claim 4, wherein:

the unit of measurement includes at least one of a number of dots printed by a printer printhead, a number of lines printed, and a unit of length.

6. The paper consumption method of a printer described in claim 4, further comprising:

outputting the paper consumption measured in the unit of measurement to an external device.

7. The paper consumption method of a printer described in claim 1, wherein the printer includes:

a maintenance counter formed in nonvolatile memory; and a maintenance counter controller that measures cumulative conveyance of paper conveyed in a forward direction and a reverse direction by a printer paper conveyance mechanism using the maintenance counter.

8. The printer described in claim 1, further comprising:

a maintenance counter formed in nonvolatile memory; and a maintenance counter controller that measures the cumulative conveyance of paper conveyed in a forward direction and a reverse direction by the printer paper conveyance mechanism using the maintenance counter.

9. A printing system comprising:

a host computer; and a printer that drives a printer printhead and a printer paper conveyance mechanism, and prints on paper, based on a command and print data supplied from the host computer;

the host computer having a command generator that generates a start measuring command that commands measuring paper consumption by the printer, and a fetch paper consumption command that commands outputting the measured paper consumption; and the printer having a paper consumption counter formed in volatile memory, a start measuring command execution unit that executes the start measuring command, and a fetch paper consumption command execution unit that executes the fetch paper consumption command.

10. The printing system described in claim 9, wherein:

the start measuring command execution unit of the printer resets a count of the paper consumption counter when the start measuring command is received from the host computer, and measures the paper consumption from a specific start measurement point to a specific stop measurement point using the paper consumption counter, and the fetch paper consumption command execution unit of the printer outputs the paper consumption expressed by the count of the paper consumption counter to the host computer when the fetch paper consumption command is received from the host computer.

11. The printing system described in claim 9, wherein:

the start measuring command includes a command parameter specifying the specific start measurement point and the specific stop measurement point for measuring paper consumption; and the start measuring command execution unit of the printer measures the paper consumption during the period from the specific start measurement point to the specific stop measurement point specified by the command parameter.

12. The printing system described in claim 9, wherein:

the start measuring command includes a command parameter for specifying a unit of measurement for the paper consumption; and the start measuring command execution unit of the printer measures the paper consumption using the unit of measurement specified by the command parameter.

13. The printing system described in claim 9, wherein:

the printer also has a maintenance counter formed in nonvolatile memory, and a maintenance counter controller that measures the cumulative conveyance of paper conveyed in a forward direction and a reverse direction by the printer paper conveyance mechanism using the maintenance counter.

14. A printer comprising:

a paper consumption counter formed in volatile memory;

a start measuring command execution unit that executes a start measuring command that commands starting measuring paper consumption; and a fetch paper consumption command execution unit that executes a fetch paper consumption command that commands outputting the paper consumption;

the start measuring command execution unit resetting a count of the paper consumption counter when the start measuring command is received, and measuring the paper consumption from a specific start measurement point to a specific stop measurement point using the paper consumption counter, and the fetch paper consumption command execution unit outputting the paper consumption expressed by the count of the paper consumption counter to an external device when the fetch paper consumption command is received.

15. The printer described in claim 14, wherein:

the start measuring command includes a command parameter specifying the specific start measurement point and the specific stop measurement point for measuring paper consumption; and the start measuring command execution unit measures the paper consumption during a period from the specific start measurement point to the specific stop measurement point.

16. The printer described in claim 14, wherein:

a start measurement time and a stop measurement time specified by the start measuring command are a start point and an end point of the printing operation for printing one print job on the paper; and the paper consumption is the length of paper consumed by one print job.

17. The printer described in claim 14, wherein:

the start measuring command includes a command parameter for specifying a unit of measurement for the paper consumption; and the start measuring command execution unit measures the paper consumption using the unit of measurement specified by the command parameter.

18. The printer described in claim 17, wherein:

the unit of measurement specified by the command parameter includes at least one of a number of dots printed by a printer printhead, a number of lines printed, and a unit of length.

19. The printer described in claim 17, wherein:

the fetch paper consumption command execution unit outputs the paper consumption measured in the unit of measurement specified by the command parameter to an external device.

* * * * *